United States Patent Office 3,150,175
Patented Sept. 22, 1964

3,150,175
PROCESS FOR THE PREPARATION OF
PANTOTHENIC ACID SALTS
Richard Griffith, Red Bank, N.J., assignor to Nopco Chemical Company, Newark, N.J., a corporation of New Jersey
No Drawing. Filed Aug. 28, 1961, Ser. No. 134,129
3 Claims. (Cl. 260—534)

The present invention relates to a process for preparing derivatives of pantothenic acid. More particularly, this invention relates to the preparation in an improved manner of salts of pantothenic acid.

D(—)-pantothenic acid, as is well known, is a growth factor which is also utilized in the form of its alkali and alkaline earth metal salts. In the preparation of these salts, alkali and alkaline earth metal salts of β-alanine are condensed with α-hydroxy-β,β-dimethyl-γ-butyrolactone, also referred to as pantolactone. When the D(—) optical isomer of the lactone is used, the resulting pantothenate salts possess the desired physiological activity. If the L(+) optical isomer of the lactone is used, the resulting pantothenate salts are physiologically inactive. Hence, resolution of the racemic pantolactone is carried out to obtain the D(—) optical isomer for condensation with the salts of β-alanine. This is generally accomplished by resolving racemic mixtures of pantolactone with 1-brucine as the resolving agent as described in British Patent No. 605,444. In this manner, a complex of 1-brucine and D(—)-pantolactone is formed and recovered. Subsequently, the D(—)-lactone is obtained by treating this complex with a base, followed by extraction to remove 1-brucine. The remaining aqueous solution is acidified at elevated temperatures in order to relactonize the D(—)-pantolactone. Alternatively, the complex can be treated with an acid and the resulting material extracted with, e.g., ether to remove the lactone. When preparing salts of pantothenic acid, the D(—)-pantolactone is condensed with alkali or alkaline earth metal salts of β-alanine in the presence of substantially anhydrous solvents. See U.S. Patent No. 2,367,791, Parke et al., January 23, 1945, and U.S. Patent No. 2,442,143, Pickel et al., May 25, 1948. Thus, in the preparation of salts of pantothenic acid wherein resolution of racemic pantolactone is carried out, it has been necessary to cleave the complex of the desired lactone and brucine before condensing the lactone with salts of β-alanine.

Accordingly, it is an object of the present invention to prepare in an improved manner salts of pantothenic acid.

It is a further object to prepare in a more direct manner than heretofore achieved, alkali and alkaline earth metal salts of pantothenic acid.

A still further object is to prepare in an improved manner physiologically active salts of pantothenic acid.

Further objects will become apparent from the detailed description given hereinafter. It is intended, however, that the detailed description and the specific examples set forth herein do not limit this invention, but merely indicate preferred embodiments thereof since various changes and modifications within the scope of the invention will become apparent to those skilled in the art.

The above, as well as other objects, have been unexpectedly and successfully accomplished in the following manner. I have found that the complex of D(—)-pantolactone with its resolving agent, 1-brucine, can be directly reacted with alkali and alkaline earth metal salts of β-alanine in the presence of substantially anhydrous polar solvents to form physiologically active alkali and alkaline earth metal D(+)-pantothenates. Thus, by the present procedure a method has been found for directly obtaining pantothenic acid salts from the complex of the lactone and the resolving agent whereby it is no longer necessary to free D(—)-pantolactone from its complex.

It might be thought that under the conditions of reaction that the complex of 1-brucine and D(—)-pantolactone is first cleaved into 1-brucine and D(—)-pantolactone and then the liberated D(—)-pantolactone condenses with the salt of β-alanine to form the pantothenate. However, this is not the case at all. That is, my process is not a two-step reaction of first decomposing the complex and then reacting the liberated pantolactone with the salt of β-alanine. This is so because, under the conditions of reaction, mere heat treatment of the complex will not bring about cleavage of the complex. In order to cleave the complex, reaction with either a base or an acid as taught in British Patent No. 605,444 is necessary. Moreover, I have found that in carrying out my process, the reaction rate between the complex and salts of β-alanine is longer than the reaction rate between pantolactone and salts of β-alanine. That is, I have found that the rate of decomposition of the complex under my conditions of reaction is slower than the reaction rate called for in the mere opening of the lactone ring as in the case of direct condensation between pantolactone and salts of β-alanine. Thus, it is concluded that this process is a second-order displacement reaction in which the salt of β-alanine attacks the complex in the rate determining step in order to yield the pantothenic acid salt. Moreover, salts of β-alanine can not be directly condensed with a salt of brucine and the lactone. Such a salt is D(—)-α,γ-dihydroxy-β,β-dimethyl butyric acid brucine acid double salt shown in British Patent No. 626,498. Thus, my process is a unique process in which the complex of D(—)-pantolactone and 1-brucine is directly reacted with salts of β-alanine to yield physiologically active pantothenic acid salts.

In practicing this invention, any alkali or alkaline earth metal salt of β-alanine can be reacted with the complex of pantolactone and 1-brucine. Examples of useful salts are: sodium β-alanate, potassium β-alanate, lithium β-alanate and calcium β-alanate. In carrying out the reaction, stoichiometric amounts of the salt of β-alanine and complex are used.

Useful solvents for carrying out the reaction are solvents which are inert with respect to the reactants and product and which are at least substantially anhydrous, i.e., solvents which contain less than about 1% by weight of moisture. Preferred solvents are polar solvents such as lower alcohols which include methanol, ethanol, n-propanol, isopropanol, n-butanol and isobutanol.

Preferably, the complex of 1-brucine D(—)-pantolactone is reacted with the salt of β-alanine under refluxing conditions, i.e., the boiling point of the reaction mixture. However, condensation can be achieved by using temperatures varying from about 30° C. to about 100° C. Of course, the lower the temperature the longer the reaction time will be. Generally speaking, substantially complete reaction can be achieved by heating for periods of time varying from about 40 hours to about 60 hours. Shorter reaction times will bring about incomplete reaction while longer reaction times may lead to partial racemization of the product.

Upon completion of the reaction, the brucine can be removed by extraction with chloroform. The crude pantothenic acid salt can be dissolved in water and treated with carbon dioxide at about 50° to 60° C. to precipitate the excess calcium as calcium carbonate. If desired, treatment with silica gel or a cation exchange resin such as sulfonated coal (Zeocarb H) can be used for the same purpose. The crude product can be spray dried or in the case of calcium pantothenate, concentrated to a syrup and treated in accordance with U.S. Patent No. 2,992,273, Kapp et al., July 11, 1961, in order to increase the bulk density of the product. However, such subsequent treatments of the salts of pantothenic acid are optional and do not form a part of this invention.

The primary advantage of the present invention is in preparing physiologically active salts of pantothenic acid from the complex of D(—)-pantolactone and 1-brucine which contain the desired D(—)-pantolactone. This process is admirably adapted to the utilization of this complex because, when resolving racemic pantolactone with 1-brucine, the complex of D(—)-pantolactone and 1-brucine precipitates out of solution and can be easily recovered by filtration or decantation. If, however, in the resolution of racemic pantolactone, sufficient brucine is introduced so that there is also formed the complex of L(+)-pantolactone and 1-brucine, said complex being soluble in the solvent used during resolution, this complex can be recovered by removing the solvent. Thereafter, this complex can be condensed with salts of β-alanine as heretofore taught. It should be understood, of course, that the resulting pantothenate is physiologically inactive.

This invention is more fully illustrated by the following examples which are merely for illustration and are not to be construed in a limiting sense.

Example I 157.2 grams of the complex of 1-brucine D(—)-pantolactone (0.3 mol) having a melting point of 209° to 212° C., 32.4 grams of calcium β-alanate (0.15 mol) and 300 ml. of methanol containing less than 1% by weight of water were refluxed for 40 hours with stirring. The reaction mixture was filtered while hot, the recovered white solids were washed with hot methanol, sucked dry and dissolved in 220 ml. of water. This solution was extracted six times, each time with a 70 ml. portion of chloroform to remove brucine. The remaining aqueous solution was concentrated to a syrup weighing 85 grams. 190 ml. of isopropanol was added to induce precipitation. The precipitate was dried at 65° C. In this manner, 45.3 grams of D(+)-calcium pantothenate was recovered. Upon analysis, the following was determined:

$[\alpha]_D^{25}$ _____ +26.1.
Volatiles _____ 1.18%.
Nitrogen _____ 5.45% (calculated 5.85%).
Calcium _____ 8.66% (calculated 8.42%).
Brucine _____ <200 p.p.m.

From the methanol mother liquor and the chloroform extracts, 146.2 grams of 1-brucine was recovered. The brucine contained 19.03% of volatiles (water of crystallization) and assayed at 98.2% purity on a dry basis.

Example II 209.6 grams of the complex of D(—)-pantolactone 1-brucine (0.4 mol), 43.2 grams of calcium β-alanate (0.2 mol) and 400 ml. of methanol were refluxed together for 52 hours with stirring. At the conclusion of the refluxing, the reaction mixture was filtered while hot. The recovered solids which were dried and weighed 93 grams were suspended in 400 ml. of warm water. This suspension was then extracted six times, each time with a 100 ml. portion of chloroform to remove the brucine. The remaining aqueous phase was concentrated to 104 grams and precipitation induced by the addition of 500 ml. of isopropanol. In this manner, 72 grams (76% of theory) of D(+)-calcium pantothenate was recovered. By analysis, the following was found:

$[\alpha]_D^{25}$ _____ +25.64
Volatiles _____Percent__ 1.65
Nitrogen _____do____ 5.47
Calcium _____do____ 8.61
Brucine _____p.p.m.__ <200

Brucine was recovered from the methanol mother liquor and chloroform extracts. The yield was 154 grams of brucine having a volatile content of 0.29% and having a purity of 97.7% on a dry basis.

Having described my invention, what I claim as new and desire to secure by Letters Patent is:

1. A process for preparing salts of pantothenic acid consisting essentially of bringing into contact with each other in the presence of a substantially anhydrous lower alkanol approximately stoichiometric quantities of a complex of 1-brucine and α-hydroxy-β-β-dimethyl-γ-butyrolactone and at least one member of the group consisting of alkali and alkaline earth metal salts of β-alanine at temperatures between about 30° C. to about 100° C.

2. A process for preparing D(+) salts of pantothenic acid comprising the steps of bringing into contact with each other approximately stoichiometric quantities of a complex of 1-brucine and D(—)-α-hydroxy-β-β-dimethyl-γ-butyrolactone and at least one member of the group consisting of alkali and alkaline earth metal salts of β-alanine at temperatures between about 30° C. to about 100° C. in the presence of a substantially anhydrous lower alkanol.

3. The process of claim 2 wherein said salt of β-alanine is calcium β-alanate.

References Cited in the file of this patent

UNITED STATES PATENTS

| | | |
|---|---|---|
| 2,367,791 | Parke et al. | Jan. 23, 1945 |
| 2,442,143 | Pickel et al. | May 25, 1948 |

FOREIGN PATENTS

| | | |
|---|---|---|
| 605,444 | Great Britain | July 23, 1948 |